US011409390B2

(12) United States Patent
Popovich et al.

(10) Patent No.: US 11,409,390 B2
(45) Date of Patent: *Aug. 9, 2022

(54) METHOD, APPARATUS AND COMPUTER-READABLE MEDIA FOR TOUCH AND SPEECH INTERFACE WITH AUDIO LOCATION

(71) Applicant: Nureva, Inc., Calgary (CA)

(72) Inventors: David Popovich, Ottawa (CA); David Douglas Springgay, Ottawa (CA); David Frederick Gurnsey, Ottawa (CA)

(73) Assignee: NUREVA, INC.

( * ) Notice: Subject to any disclaimer, the term of this patent is extended or adjusted under 35 U.S.C. 154(b) by 0 days.

This patent is subject to a terminal disclaimer.

(21) Appl. No.: 17/085,118

(22) Filed: Oct. 30, 2020

(65) Prior Publication Data

US 2021/0048915 A1   Feb. 18, 2021

Related U.S. Application Data

(63) Continuation of application No. 16/426,472, filed on May 30, 2019, now Pat. No. 10,845,909, which is a
(Continued)

(51) Int. Cl.
*G06F 3/041* (2006.01)
*G10L 15/22* (2006.01)
(Continued)

(52) U.S. Cl.
CPC ............ *G06F 3/0416* (2013.01); *G06F 3/016* (2013.01); *G06F 3/0412* (2013.01);
(Continued)

(58) Field of Classification Search
USPC ........ 345/156, 173, 174, 177; 704/204, 260, 704/275; 381/94.3
See application file for complete search history.

(56) References Cited

U.S. PATENT DOCUMENTS

| 4,499,578 A | 2/1985 | Marouf et al. |
| 5,337,363 A | 8/1994 | Platt |

(Continued)

FOREIGN PATENT DOCUMENTS

| CA | 2499033 A1 | 9/2005 |
| DE | 102014012158 A1 | 12/2015 |

(Continued)

OTHER PUBLICATIONS

Joseph Hector Dibiase, Thesis entitled, "A High-Accuracy, Low-Latency Technique for Talker Localization in Reverberant Environments Using Microphone Arrays", Brown University, May 2000.
(Continued)

*Primary Examiner* — Thuy N Pardo
(74) *Attorney, Agent, or Firm* — Katten Muchin Rosenman LLP

(57) ABSTRACT

Method, apparatus, and computer-readable media for touch and speech interface, with audio location, includes structure and/or function whereby at least one processor: (i) receives a touch input from a touch device; (ii) establishes a touch-speech time window; (iii) receives a speech input from a speech device; (iii) determines whether the speech input is present in a global dictionary; (iv) determines a location of a sound source from the speech device; (v) determines whether the touch input and the location of the speech input are both within a same region; (vi) if the speech input is in the dictionary, determines whether the speech input has been received within the window; and (vii) if the speech input has been received within the window, and the touch input and the speech input are both within the same region, activates an action corresponding to both the touch input and the speech input.

14 Claims, 15 Drawing Sheets

Related U.S. Application Data continuation of application No. 15/615,108, filed on Jun. 6, 2017, now Pat. No. 10,338,713.

(60) Provisional application No. 62/346,319, filed on Jun. 6, 2016.

(51) Int. Cl.
| | |
|---|---|
| *G06F 3/0488* | (2022.01) |
| *G06F 3/16* | (2006.01) |
| *G10L 15/26* | (2006.01) |
| *G06F 3/01* | (2006.01) |

(52) U.S. Cl.
CPC ............ *G06F 3/0488* (2013.01); *G06F 3/167* (2013.01); *G10L 15/22* (2013.01); *G10L 15/26* (2013.01); *G06F 2203/0381* (2013.01); *G10L 2015/226* (2013.01)

(56) References Cited

U.S. PATENT DOCUMENTS

| | | | |
|---|---|---|---|
| 5,477,270 | A | 12/1995 | Park |
| 5,757,937 | A * | 5/1998 | Itoh ..................... G10L 21/0208 381/94.3 |
| 6,624,841 | B1 | 9/2003 | Buchner et al. |
| 6,912,718 | B1 | 6/2005 | Chang et al. |
| 6,961,439 | B2 | 11/2005 | Ballas |
| 7,058,168 | B1 | 6/2006 | Knappe et al. |
| 7,130,705 | B2 | 10/2006 | Amir et al. |
| 7,177,413 | B2 | 2/2007 | O'Toole |
| 7,533,346 | B2 | 5/2009 | McGrath et al. |
| 7,720,212 | B1 | 5/2010 | Jouppi et al. |
| 7,848,531 | B1 | 12/2010 | Vickers et al. |
| 8,014,884 | B2 | 9/2011 | Kindo et al. |
| 8,073,125 | B2 | 12/2011 | Zhang et al. |
| 8,185,387 | B1 | 5/2012 | Lachapelle |
| 8,363,810 | B2 | 1/2013 | Yoakum et al. |
| 8,462,190 | B2 | 6/2013 | Togami et al. |
| 8,958,569 | B2 | 2/2015 | Bar-Zeev et al. |
| 9,823,893 | B2 | 11/2017 | Bhat et al. |
| 2002/0064149 | A1 | 5/2002 | Elliott et al. |
| 2002/0077830 | A1 | 6/2002 | Suomela et al. |
| 2004/0013252 | A1 | 1/2004 | Craner |
| 2004/0257432 | A1 | 12/2004 | Girish et al. |
| 2008/0085014 | A1 | 4/2008 | Chen et al. |
| 2008/0162141 | A1 | 7/2008 | Lortz |
| 2008/0211779 | A1 | 9/2008 | Pryor |
| 2009/0238378 | A1 | 9/2009 | Kikinis |
| 2010/0070281 | A1 * | 3/2010 | Conkie .................. G10L 13/08 704/260 |
| 2010/0135118 | A1 | 6/2010 | Van Leest |
| 2010/0250248 | A1 | 9/2010 | Willins |
| 2010/0312547 | A1 | 12/2010 | Van Os et al. |
| 2011/0022393 | A1 | 1/2011 | Waller et al. |
| 2011/0037725 | A1 | 2/2011 | Pryor |
| 2011/0074693 | A1 | 3/2011 | Ranford et al. |
| 2012/0069131 | A1 | 3/2012 | Abelow |
| 2012/0109632 | A1 | 3/2012 | Sugiura et al. |
| 2012/0121076 | A1 | 5/2012 | Yoakum |
| 2013/0101134 | A1 | 4/2013 | Betts-Lacroix |
| 2013/0144629 | A1 | 6/2013 | Johnston et al. |
| 2013/0211842 | A1 | 8/2013 | Edgar et al. |
| 2013/0257780 | A1 | 10/2013 | Baron |
| 2014/0002444 | A1 | 2/2014 | Bennett et al. |
| 2014/0067366 | A1 | 3/2014 | Jansche et al. |
| 2014/0078075 | A1 | 3/2014 | Walensky et al. |
| 2014/0119552 | A1 | 5/2014 | Beaucoup |
| 2014/0218372 | A1 | 8/2014 | Missig et al. |
| 2014/0222436 | A1 | 8/2014 | Binder et al. |
| 2015/0382127 | A1 | 12/2015 | Sun et al. |
| 2016/0006879 | A1 | 1/2016 | Dickins |
| 2016/0026253 | A1 | 1/2016 | Bradski et al. |
| 2016/0026434 | A1 | 1/2016 | Johnston et al. |
| 2016/0103655 | A1 | 4/2016 | Klien |
| 2016/0124706 | A1 * | 5/2016 | Vasilieff .................. G10L 15/22 704/275 |
| 2016/0125893 | A1 * | 5/2016 | Le Magoarou ....... G10L 21/028 704/204 |
| 2016/0075016 | A1 | 7/2016 | Laurent et al. |
| 2016/0232108 | A1 | 8/2016 | Goss |
| 2016/0234019 | A1 | 8/2016 | Goss |
| 2016/0283455 | A1 | 9/2016 | Mardanbegi |
| 2016/0284346 | A1 * | 9/2016 | Visser ..................... G10L 25/30 |
| 2016/0379660 | A1 * | 12/2016 | Wright .................. H04M 3/568 381/57 |
| 2017/0061138 | A1 | 3/2017 | Lambert |
| 2017/0098453 | A1 * | 4/2017 | Wright .................... G06F 3/017 |
| 2017/0102818 | A1 | 4/2017 | Gazdzinski et al. |
| 2017/0102918 | A1 | 4/2017 | Gazdzinski |
| 2017/0353811 | A1 * | 12/2017 | McGibney .............. H04S 7/303 |
| 2019/0094981 | A1 | 3/2019 | Bradski |

FOREIGN PATENT DOCUMENTS

| | | |
|---|---|---|
| EP | 0 479 604 A2 | 4/1992 |
| EP | 2 063 419 A1 | 5/2009 |
| WO | 1992/009921 A1 | 6/1992 |
| WO | 97/33450 A1 | 9/1997 |
| WO | 2009/117450 A1 | 9/2009 |
| WO | 2010/147600 A2 | 12/2010 |
| WO | 2016/197257 A1 | 12/2016 |

OTHER PUBLICATIONS

Transmittal; International Search Report; and Written Opinion of the International Searching Authority for International Application No. PCT/CA2017/050672 dated Oct. 10, 2017.

International Preliminary Report on Patentability for International Application No. PCT/CA2017/050690, dated Aug. 13, 2018.

Extended European Search Report for European Patent Application No. 170809498.3 dated Mar. 5, 2019.

Transmittal; International Search Report; and the Written Opinion of the International Searching Authority for International Application No. PCT/CA2017/050690, dated Sep. 25, 2017.

U.S. Appl. No. 62/346,263, filed Jun. 6, 2016.

Transmittal; International Search Report; and Written Opinion of the international Searching Authority for International Application No. PCT/CA2017/050691, dated Sep. 21, 2017.

Notice of Allowance dated Aug. 5, 2020, from U.S. Appl. No. 16/541,261, 17 sheets.

Office Action dated Apr. 30, 2020, from U.S. Appl. No. 16/541,261, 30 sheets.

Notice of Allowance dated Oct. 9, 2020, from U.S. Appl. No. 16/426,472, 6 sheets.

Notice of Allowance dated Jul. 22, 2020, from U.S. Appl. No. 16/426,472, 36 sheets.

Final Rejection dated Jan. 10, 2020, from U.S. Appl. No. 16/426,472, 34 sheets.

Non-Final Rejection dated Sep. 6, 2019, from U.S. Appl. No. 16/426,472, 17 sheets.

Notice of Allowance dated May 15, 2019, from U.S. Appl. No. 15/615,108, 6 sheets.

Notice of Allowance dated Feb. 11, 2019, from U.S. Appl. No. 15/615,108, 31 sheets.

Final Rejection dated Oct. 4, 2018, from U.S. Appl. No. 15/615,108, 30 sheets.

Non-Final Rejection dated May 17, 2018, from U.S. Appl. No. 15/615,108, 20 sheets.

* cited by examiner

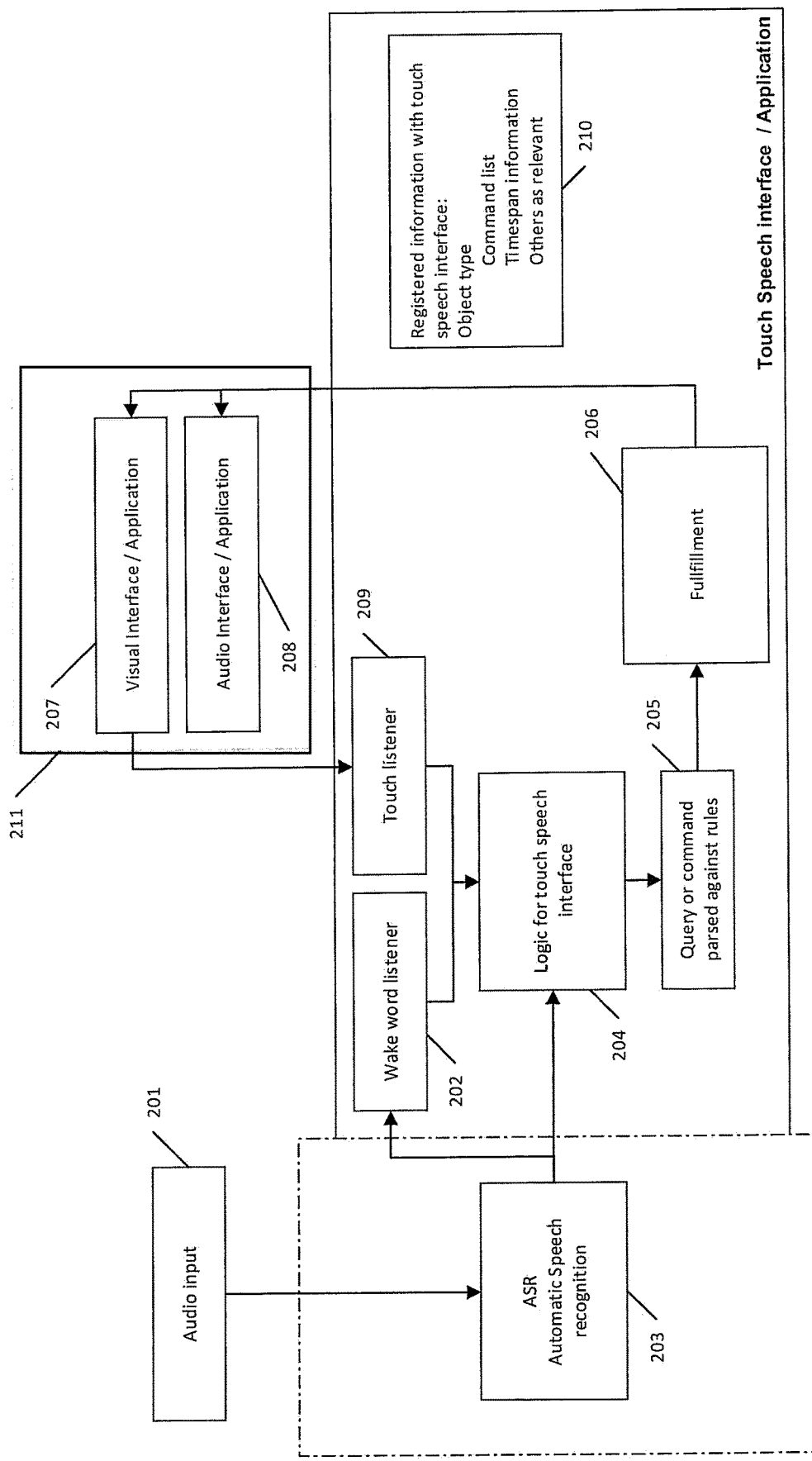
Fig 2a. Example for Touch Speech Interface

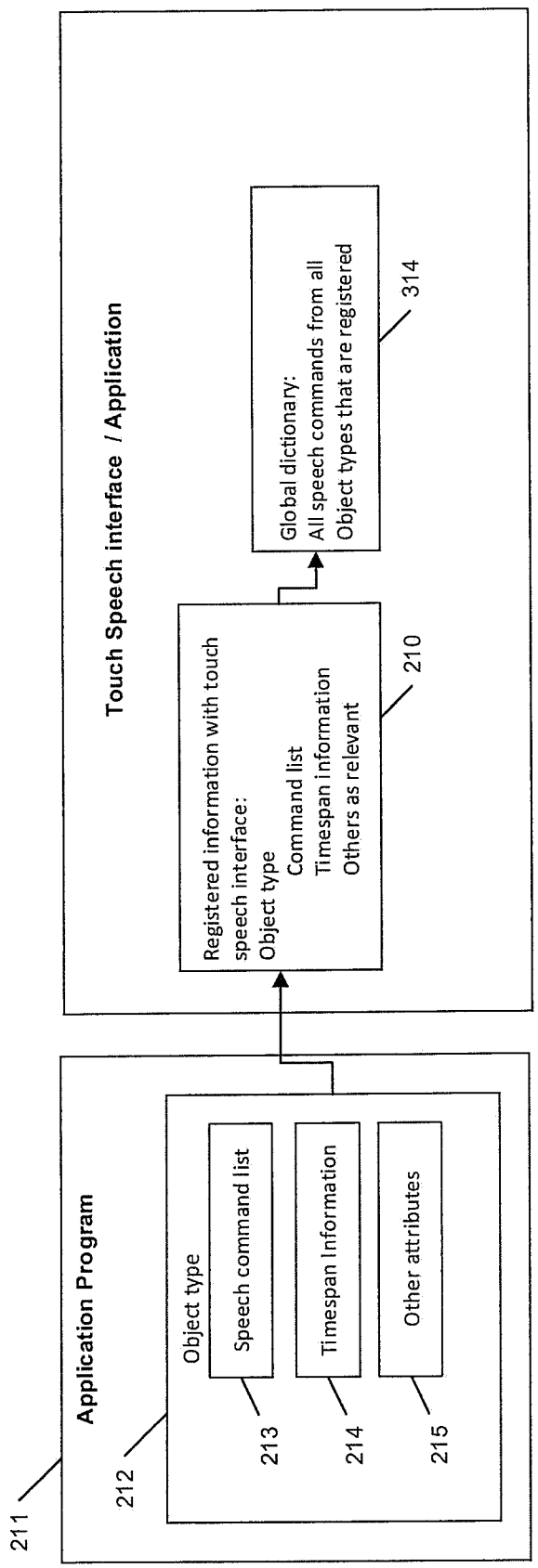
Fig 2b. Example for Touch Speech Interface

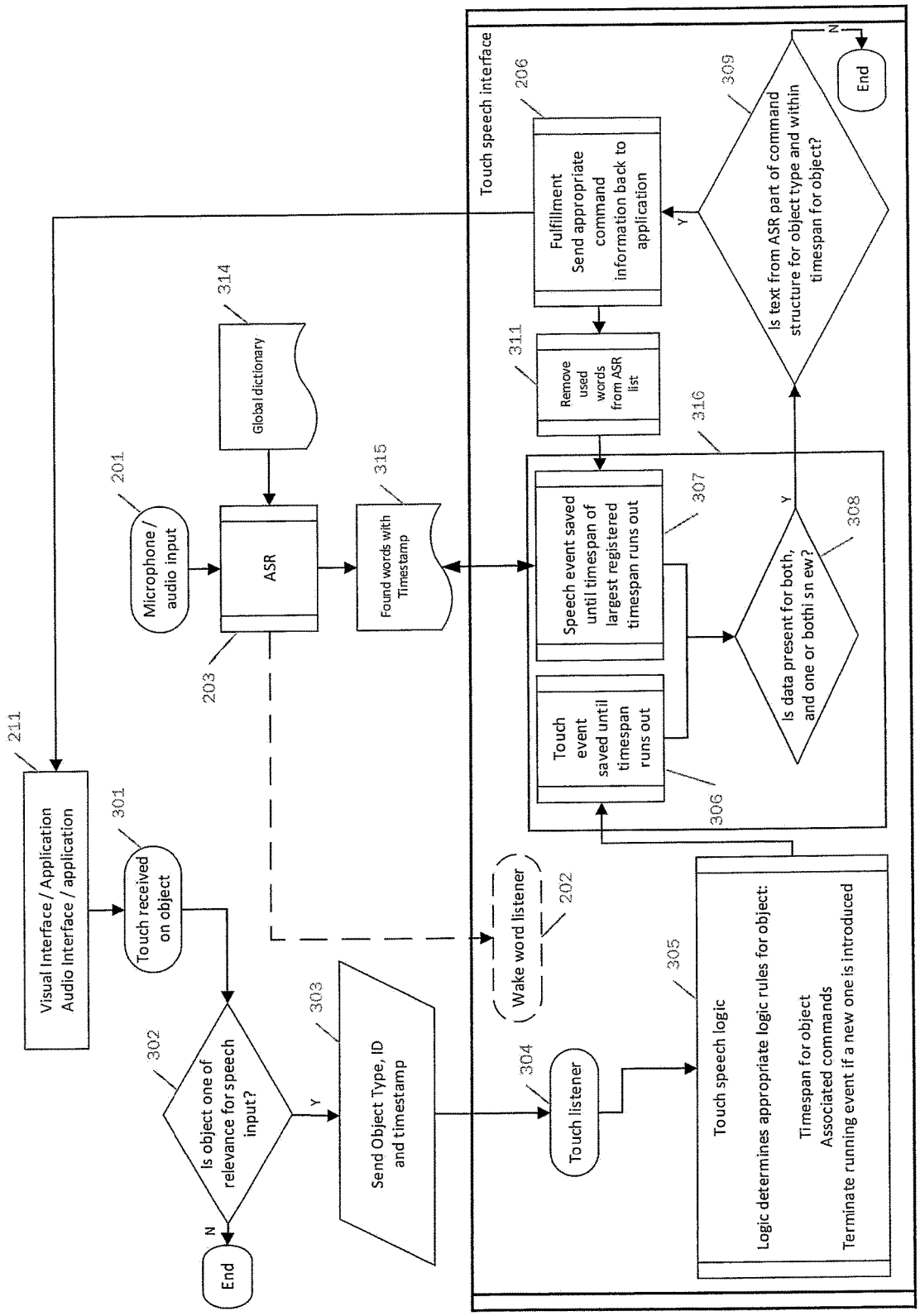
Fig 3 Touch and speech interface logic

Fig 4. Touch speech example of single touch with simple command to create action

| Touching on | Saying command | Action | Net effort |
|---|---|---|---|
| Note | Blue | Turns note Blue | One touch, one spoken word |
| | Green | Turns note Green | One touch, one spoken word |
| | Pink | Turns note Pink | One touch, one spoken word |
| | Yellow | Turns note Yellow | One touch, one spoken word |
| | Delete | Deletes note | One touch, one spoken word |
| | Edit | Takes note into edit mode | One touch, one spoken word |
| | Duplicate | Duplicates note | One touch, one spoken word |
| Sketch | Delete | Deletes Sketch | One touch, one spoken word |
| | Edit | Takes Sketch into edit mode | One touch, one spoken word |
| | Duplicate | Duplicates Sketch | One touch, one spoken word |
| Flipchart | Delete | Deletes Flipchart | One touch, one spoken word |
| | Edit | Takes Flipchart into edit mode | One touch, one spoken word |
| | Duplicate | Duplicates Flipchart | One touch, one spoken word |
| Group | Delete | Deletes Group | One touch, one spoken word |
| | Edit | Takes Group into edit mode | One touch, one spoken word |
| | Duplicate | Duplicates Group | One touch, one spoken word |
| Canvas | New Note, create note, create a new note | Creates new note, in location touched | One touch, two spoken words |
| | New Sketch, create sketch, create a new sketch | Creates new Sketch, in location touched | One touch, two spoken words |
| | New Group, create group, create a new group | Creates new Group, in location touched | One touch, two spoken words |
| | New Flipchart, create flipchart, create a new flipchart | Creates new flipchart, in location touched | One touch, two spoken words |
| | Close | Closes the canvas | One touch, one spoken word |

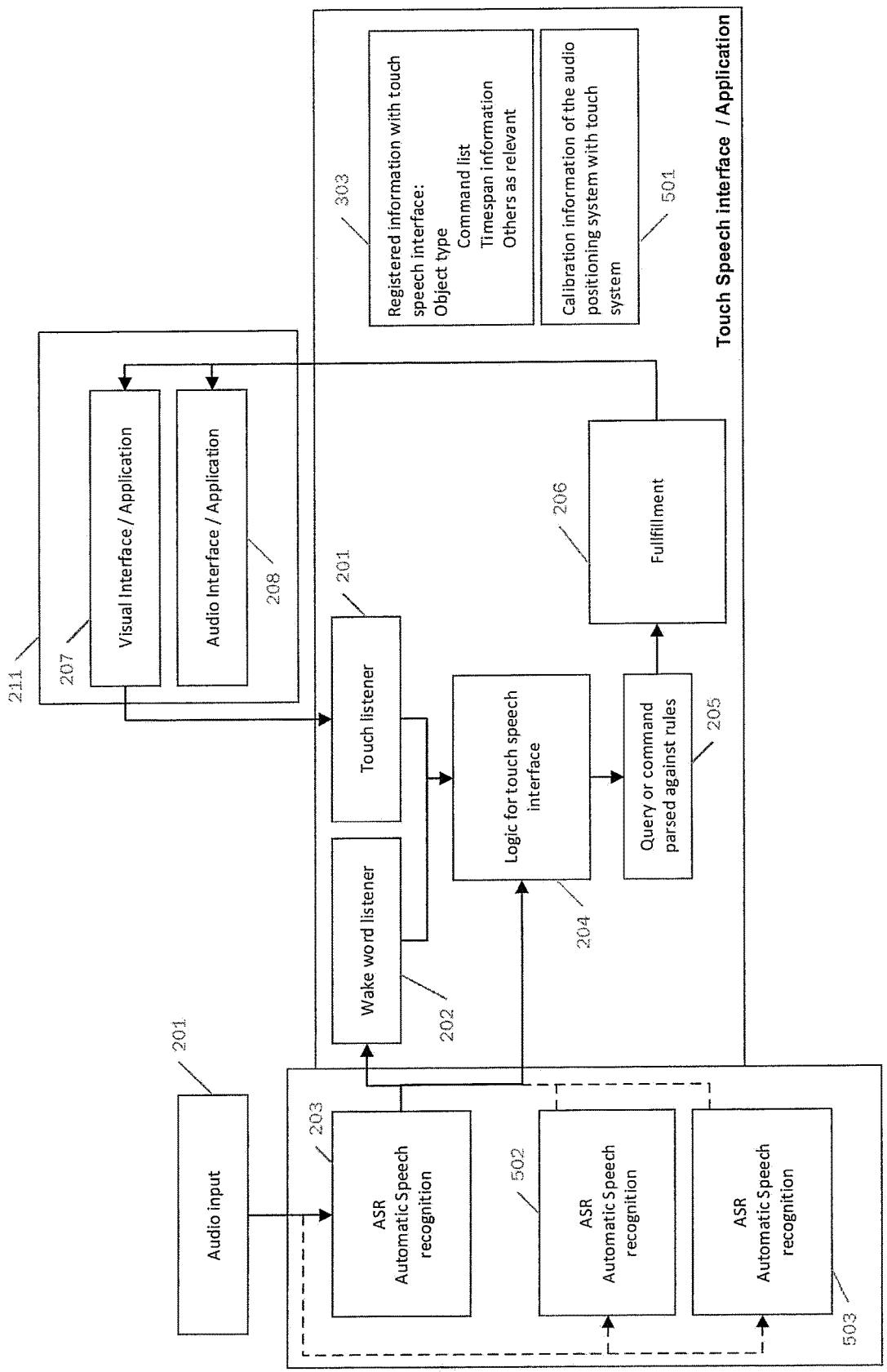
Fig 5. Example for Touch Speech Interface with multiple audio streams

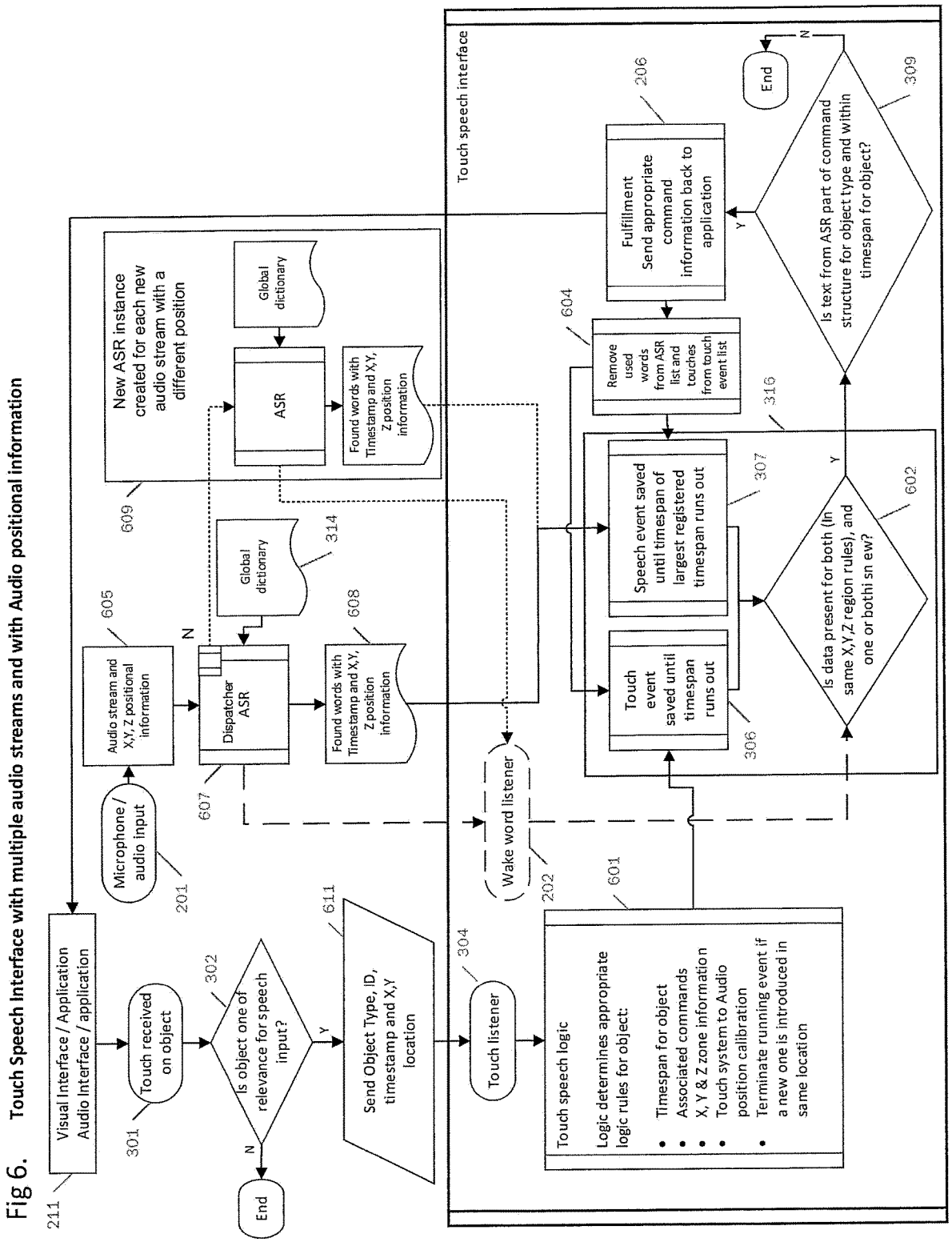
Fig 6. Touch Speech Interface with multiple audio streams and with Audio positional information

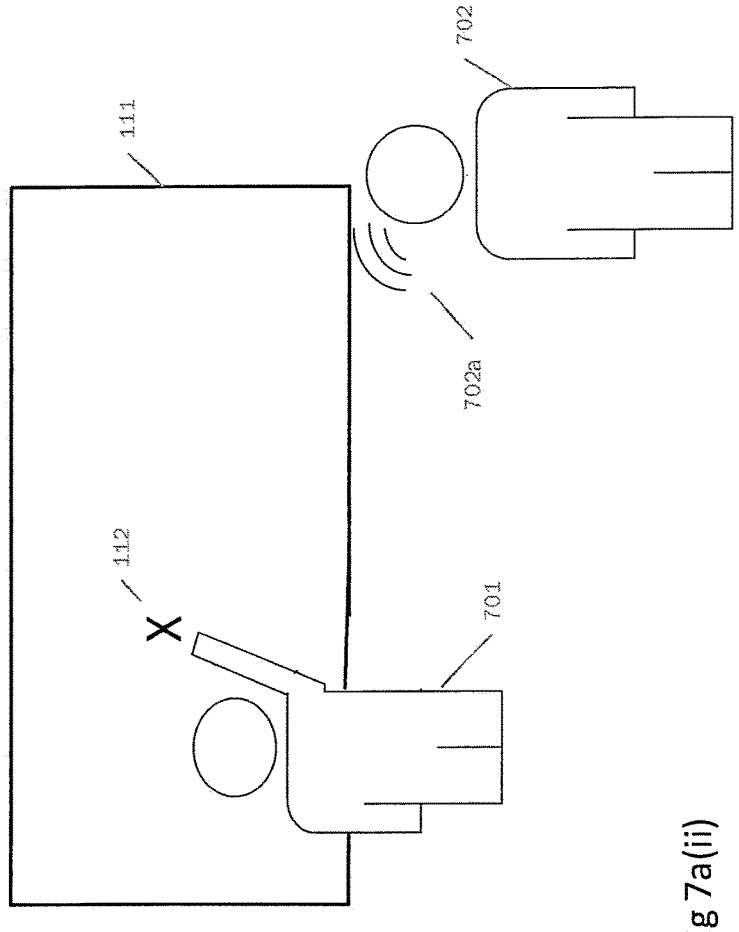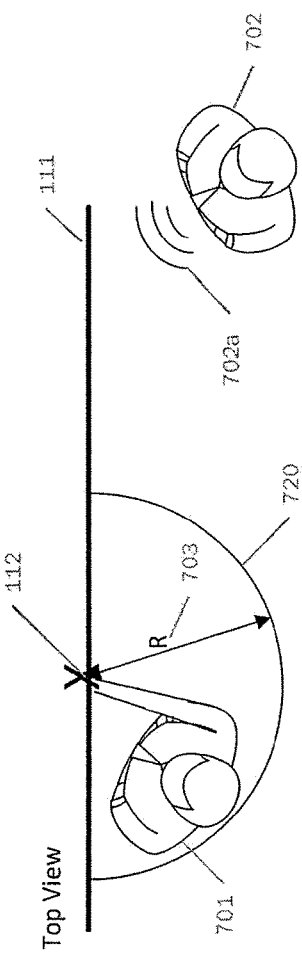

Fig 7b(i)
Without audio positioning information
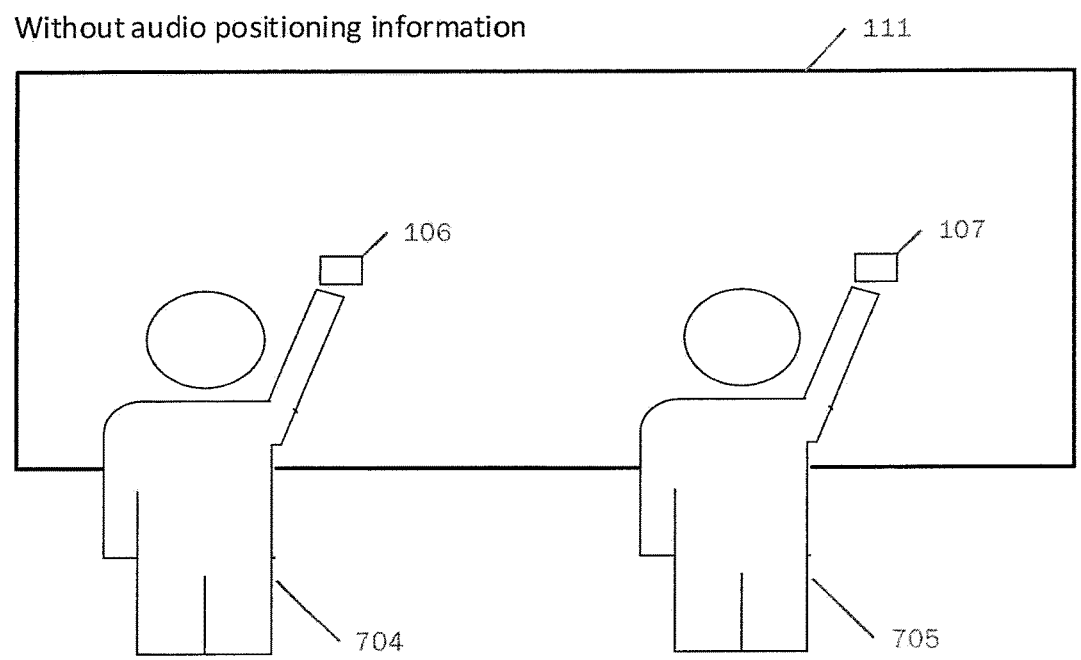
Fig 7b(ii)
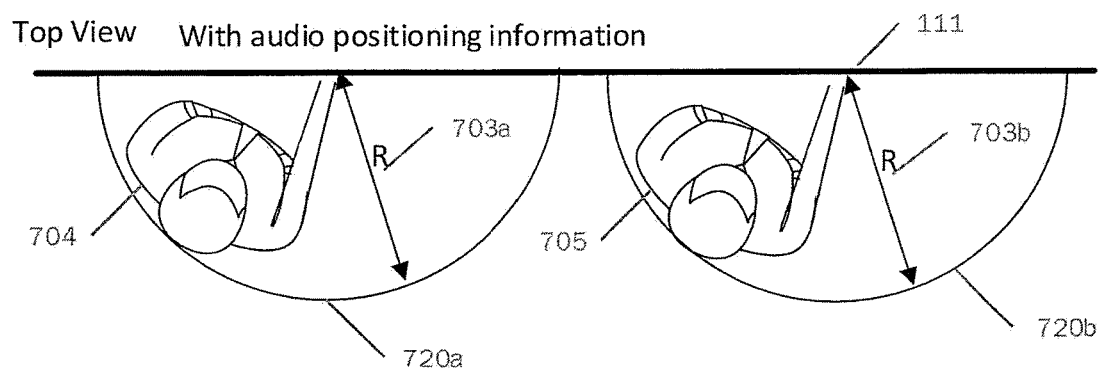

Fig 7c(i)
Front View
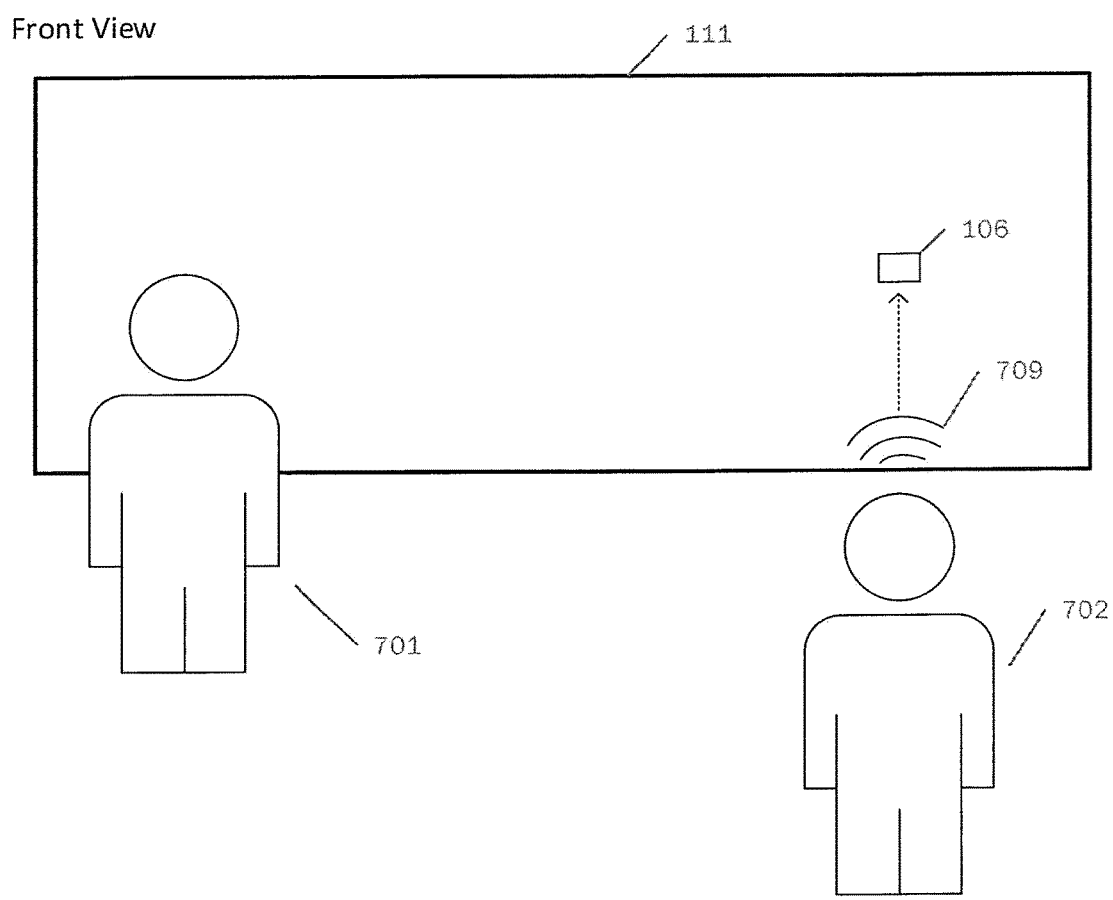
Fig 7c(ii)
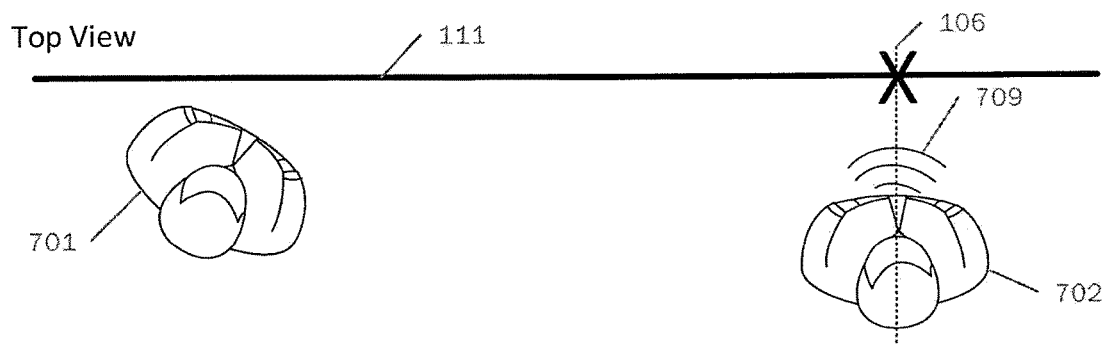

Fig 7d(i)
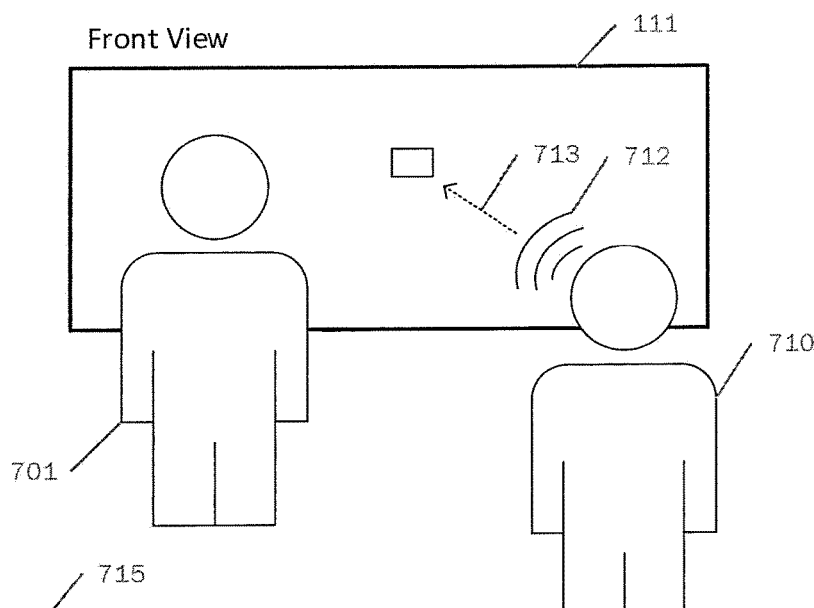
Fig 7d(ii)
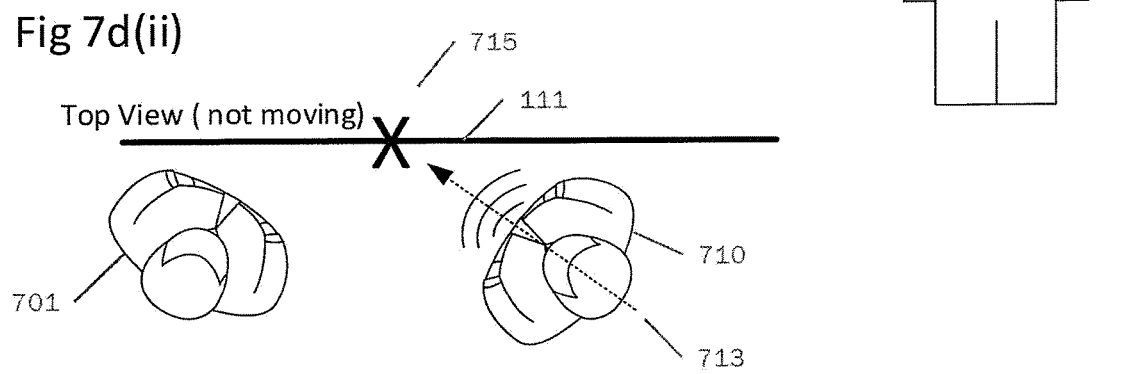
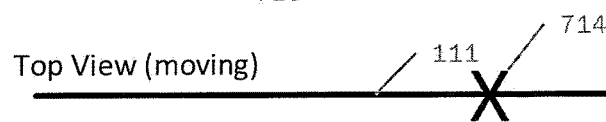
Fig 7d(iii)
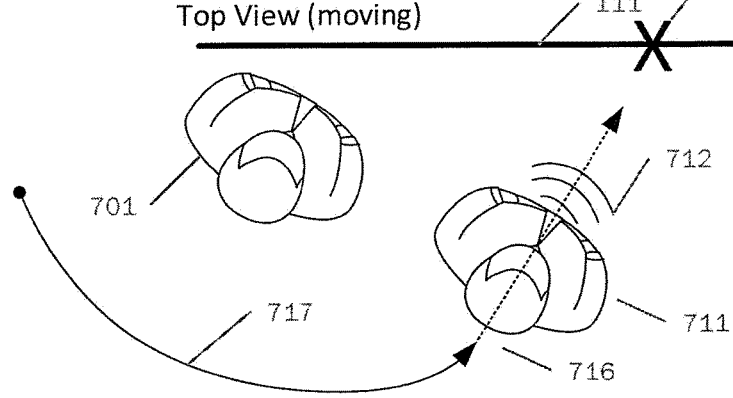

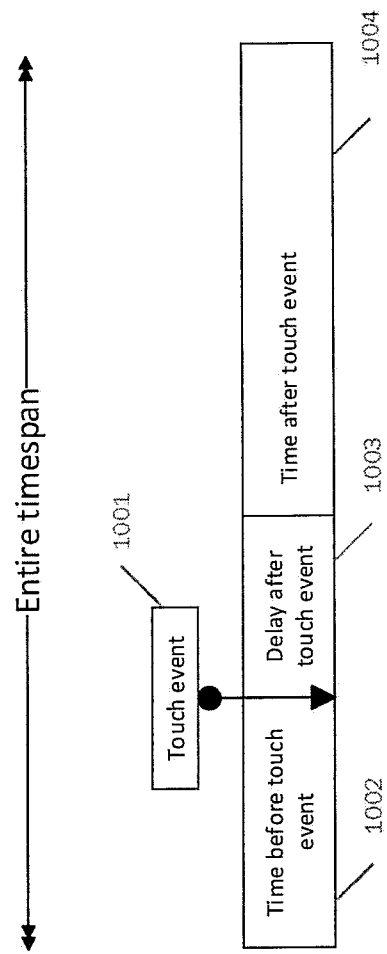
Fig 10. Touch context timespan (Touch speech time window)

METHOD, APPARATUS AND COMPUTER-READABLE MEDIA FOR TOUCH AND SPEECH INTERFACE WITH AUDIO LOCATION

CROSS-REFERENCE TO RELATED APPLICATIONS

This application is a continuation of U.S. patent application Ser. No. 16/426,472, filed May 30, 2019, which is a continuation of U.S. patent application Ser. No. 15/615,108, filed Jun. 6, 2017 (now U.S. Pat. No. 10,338,713), issued Jul. 2, 2019, which claims priority to U.S. Provisional Patent Application No. 62/346,319, filed Jun. 6, 2016. The contents of these applications are incorporated by reference in their entirety.

TECHNICAL FIELD OF THE INVENTION

The present invention generally relates to a method of improving touch speech interfaces and speech interfaces, by using the position of the audio that the touch speech interface or speech interface receives. These improvements relate to disambiguating persons speaking from persons touching and speaking, providing location context for speech commands, and the ability to receive multiple streams of audio from the audio input device, along with location information, for a touch speech interface or speech interface, preferably for multi-person environments. The intended use for the invention is for large interactive surfaces which support multi user interfaces, but it could also be applied to smaller interactive devices as well.

BACKGROUND

Collaboration systems have been known in the current art for some time. The intent is to bring multiple users together to perform workflows such as but not limited to brainstorming, process improvement, and other information management sessions. There has been significant effort to transition these sessions from an analog format, such as sticky notes or white boarding, into a digital workspace with all the improvements that digital has, such as persistent storage and remote user participation.

As systems have grown more complex and the number of in-room users has increased, the complexity of inputting information into multiuser collaboration workspaces has increased as the systems have increased. With increased complexity, the users of these systems typically experience longer and inefficient object management workflows. The current art has attempted unsuccessfully to solve these problems.

Collaboration can be as simple as a teleconference and or video conference system that has local and remote users of the system. Both systems have touch and speech inputs; however they are limited in regards to real-time data exchange, have limited data retention and multimedia digital collaboration features, and are not useful for large in-room collaboration implementations.

A more complex collaboration system will utilize an audio and or video teleconference system in conjunction with single or multiple touch enabled interfaces to form a large format collaboration display that can be shared through the network or utilized locally in the room as a standalone system.

In-room multiuser interactive small or large display collaboration systems have been implemented in several different form factor formats. Some of them attempt to allow multiple users to interact with the system in concurrent usage. These systems initially started out as single user input systems and through technological advancement have been improved to incorporate concurrent users entering information/data through the touch enabled user interfaces across multi-interactive touch screens connected as a single digital workspace.

These systems, while allowing multiple touch events at the same time to support multiple in room users, are still subject to object management work flow limitations with multiple touch events required to create, move, edit, and/or delete objects. These types of systems can support multiple users at the interactive touch surface however they are limited typically to touch only events which can be a multitude of touch events executed through a hierarchal nested command structure. This can create visual clutter and loss of touch context with multiple users assessing the system, as the system may not be able to differentiate asynchronous touch events in a seamless manner which decreases workflow efficiency and increases object management times.

To enhance the functionality of touch interaction systems, a speech recognition engine can be implemented to help minimize the user touch events on the interface system. Systems may see an increase in workflow efficiency by utilizing both modalities. Speech interfaces typically require a wake word or a touch event to activate. There can be advantages to an Automatic Speech Recognition (ASR) implementation through decreased touch events or possible eliminated touch events. Such systems are typically deployed as single user systems and have problems managing multiple concurrent users and may not be suitable for parallel work flows on an interactive touch enabled systems that can support multiple users.

If one user is interacting with the system and there is/are one or more other persons speaking, then the touch and speech interface could match a touch action at a wall with a speech event away from the interactive display that was not intended by the user.

As multimedia data objects become more complex and are maintained and referenced in groups and nested hierarchies, the inefficiencies in the current art become even more pronounced. As collaboration systems become larger and more complex, limitations in the current art become problematic in how multimedia is created and managed, especially under concurrent user situations.

The present invention is intended to overcome one or more of the problems discussed above.

SUMMARY OF THE INVENTION

The present invention allows users to utilize multiple modalities to interface with objects in single and multiusers systems. By incorporating known multiple user positions, through accurate X,Y,Z coordinate audio position determination, to concurrently capture the users actual in-room real-time position in relation to the interactive display, and to also capture the user's speech commands from that specific location, the system is able to react to dynamic multi-user driven context situations and minimize the amount of individual user interaction while optimizing the command hierarchy and interaction to the most efficient modality at the time of interaction, across small and large interactive touch display surfaces, while ignoring out of context and out of region speech events. Because the system is actively listening for commands to apply to a dynamic touch context situation with a known user position, the system is able to adapt by applying specific command functions appropriate to the touch context in a less structured sequence allowing for more flexible user interaction possibilities, while ignoring speech events that are not within the appropriate per-user speech region, allowing a speech interface to be utilized in a multiuser interactive touch enable system.

The speech only capability of the touch speech interface can work as any traditional speech interface in terms of listening for spoken commands. It may require a "Wake word" for the listener. Although the ASR is always running, the "Wake word" may be a trigger for the logic to look for a command irrespective of touch events. When commands are spoken, the context for the final action to complete is not known and the system must be given additional information for the final action to complete, or else the system must make an assumption that could be incorrect. A user who speaks "System, create note" will not get the note where they are currently positioned as the system does not know their location, which results in notes, as an example, being placed in default positions on the interface display that may not be useful or appropriate, especially in a large interactive display system.

For touch speech interactions and speech only interactions, the commands should be isolated, so that the ASR can process the command. If multiple people are speaking, then the ASR will not reliably return a matched command.

According to one aspect of the present invention, the touch speech and position interface preferably utilizes the positional information of multiple sound sources, as measured by an audio microphone system capable of providing X, Y and/or X, Y and Z positional information, and combining it with a touch speech interface. Using the positional information, along with the object of touch, position-of-touch, and potential speech commands relating to the object of touch, it is possible to improve a system's ability to infer a single user or a plurality of user interaction intentions, even under concurrent usage.

According to another aspect of the present system, with an audio microphone system, calibrated to be used in the context of the touch system for X, Y and/or X,Y & Z audio source information, it is possible to disambiguate a speech event from a person within proximity of a touch event on an interactive surface from a speech event from someone who is not in proximity of the location that was touched.

According to a further aspect of the present invention, with an audio microphone system, calibrated in the context of the touch system for X, Y and/or X,Y & Z audio source positional information, it is possible to use touch speech interface logic such that a new touch that is received from an application program does not necessarily have to remove events from the touch buffer. Instead, only touch events that are within reach of a first event need to have the first event removed. This allows two or more users to have potential touch events in the buffer for a potential match to a speech command from the ASR without colliding with one another.

According to yet another aspect of the present invention, with an audio microphone system, calibrated in the context of the touch system for X, Y and/or X,Y & Z audio source positional information, it is possible to use speech interface logic such that a command that is issued by a user can have the context for the location of the command action inferred. This allows a user to speak "System, create note" and the system will create a note in front of the user on the interactive display.

According to a further aspect of the present invention, with an audio microphone system, calibrated in the context of the touch system for X, Y and/or X,Y & Z audio source positional information, the system can calculate a vector location utilizing the direction of the audio source emission and/or the movement of the user. If a command is issued in one location, but the user's speaking direction is towards a different part of the interactive system display area, then the information can be placed on the different part of the workspace by computing a vector created from the user's speaking direction. The same can be true if a user is walking around the room while issuing a command. A vector can be computed from the tracked position of the user who is speaking.

According to yet another aspect of the present invention, with an audio microphone system, calibrated in the context of the touch system for X, Y and/or X,Y & Z audio source information, that is also capable of producing multiple audio streams for the identified source positions, it is possible to use touch speech interface logic as well as speech logic to support multiple simultaneous touch speech commands and/or multiple simultaneous speech commands. The touch speech interface and/or the speech interface will initiate a new instance of ASR for each new audio stream that it is provided. This allows multiple users to work together and issue commands without interfering with each other's speech commands and/or combined touch actions while utilizing the interactive display system.

According to another aspect of the present invention, touch and speech input with audio location apparatus is configured for a user to provide input to (i) a touch sensitive input device and (ii) a speech input device At least one memory stores a plurality of words in a global dictionary. At least one processor configured to: (i) receive an input from the touch sensitive input device; (ii) establish a touch speech time window with respect to the received input from the touch sensitive input device; (iii) receive an input from the speech input device; (iv) determine whether the received input from the speech input device is present in the global dictionary; (v) determine a location of a sound source from the received input from the speech input device; (vi) determine whether the received input from the touch sensitive input device and the location of received input from the speech input device are both within a same region of the touch sensitive input device; (vii) if the received input from the speech input device is present in the global dictionary, determine whether the received input from the speech input device has been received within the established touch speech time window; and (viii) if the received input from the speech input device has been received within the established touch speech time window, and the received input from the touch sensitive input device and the received input from the speech input device are both within a same region of the touch sensitive input device, activate an action corresponding to both (i) the received input from the touch sensitive input device and (ii) the received input from the speech input device.

According to a further aspect of the present invention, a touch and speech input with audio location method for a user to provide input to (i) a touch sensitive input device and (ii) a speech input device stores a plurality of words in a global dictionary in at least one memory. At least one processor is used to: (i) receive an input from the touch sensitive input device; (ii) establish a touch speech time window with respect to the received input from the touch sensitive input device; (iii) receive an input from the speech input device; (iii) determine whether the received input from the speech input device is present in the global dictionary; (iv) determine a location of a sound source from the received input from the speech input device; (v) determine whether the received input from the touch sensitive input device and the location of received input from the speech input device are both within a same region of the touch sensitive input device; (vi) if the received input from the speech input device is present in the global dictionary, determine whether the received input from the speech input device has been received within the established touch speech time window; and (vii) if the received input from the speech input device has been received within the established touch speech time window, and the received input from the touch sensitive input device and the received input from the speech input device are both within a same region of the touch sensitive input device, activate an action corresponding to both (a) the received input from the touch sensitive input device and (b) the received input from the speech input device.

According to yet another aspect of the present invention, program code is embodied in a non-transitory computer readable medium for touch and speech input for a user to provide input to a touch sensitive input device and using a speech input device. The program includes instructions which cause at least one processor to: (i) store a plurality of words in a global dictionary in at least one memory; (ii) receive an input from the touch sensitive input device; (iii) establish a touch speech time window with respect to the received input from the touch sensitive input device; (iv) receive an input from the speech input device; (v) determine whether the received input from the speech input device is present in the global dictionary; (vi) determine a location of a sound source from the received input from the speech input device; (vii) determine whether the received input from the touch sensitive input device and the location of received input from the speech input device are both within a same region of the touch sensitive input device; (viii) if the received input from the speech input device is present in the global dictionary, determine whether the received input from the speech input device has been received within the established touch speech time window; and (ix) if the received input from the speech input device has been received within the established touch speech time window, and the received input from the touch sensitive input device and the received input from the speech input device are both within a same region of the touch sensitive input device, activate an action corresponding to both (a) the received input from the touch sensitive input device and (b) the received input from the speech input device.

BRIEF DESCRIPTION OF THE DRAWINGS

FIGS. 2a and 2b are diagrammatic illustrations of the architecture and functional relationships for a touch speech interface.

FIG. 3 is a flow chart depicting the logic flow for preferred the touch speech interface.

FIG. 4 is an embodiment of a table of touch speech commands.

FIG. 5 is a diagrammatic illustration of the preferred architecture for a touch speech interface that supports audio position information and multiple audio streams.

FIG. 6 is a flow chart depicting the logic flow for the touch speech interface with audio position and multiple audio streams.

FIGS. 7a(i), 7a(ii), 7b(i), 7b(ii), 7c(i), 7c(ii), 7d(i), 7d(ii), and 7d(iii) are illustrations depicting the different human position and interaction types.

FIG. 10 is a diagrammatic illustration of the timespan context for an object (touch speech time window).

DETAILED DESCRIPTION OF THE PRESENTLY PREFERRED EXEMPLARY EMBODIMENTS

The present invention is directed to systems that utilize multiuser and/or single user interactive surfaces, but is applicable to any computer system(s) or device(s) that utilizes a touch screen which also has the capability of running an automated speech recognition system that also utilizes real-time multi-user coordinate (X,Y or X,Y,Z) information to disambiguate, through coordinate position, multiple speech and touch user input streams, for the purpose of executing instructions and or menu commands.

Thus, speech input can be improved by combining touch information and speech information. The touch information can provide a time frame for speech recognition events and can also provide the context for the speech recognition to be applied. Touch speech events and speech events can be made more robust and improve the user experience when the location of the audio source for touch speech input or speech input is known.

Advantageously, embodiments of the present invention pertain to utilizing audio-determined positional information centered around touch and ASR inputs to provide systems and methods to give users of the system a capability to create, delete, and manipulate all properties of the objects on an interactive surface utilizing dynamic voice and touch combinations that optimize the interactive workflow in a single or multiuser environment.

The words computational device, computer and device are used interchangeably and can be construed to mean the same thing.

Figure 1A:
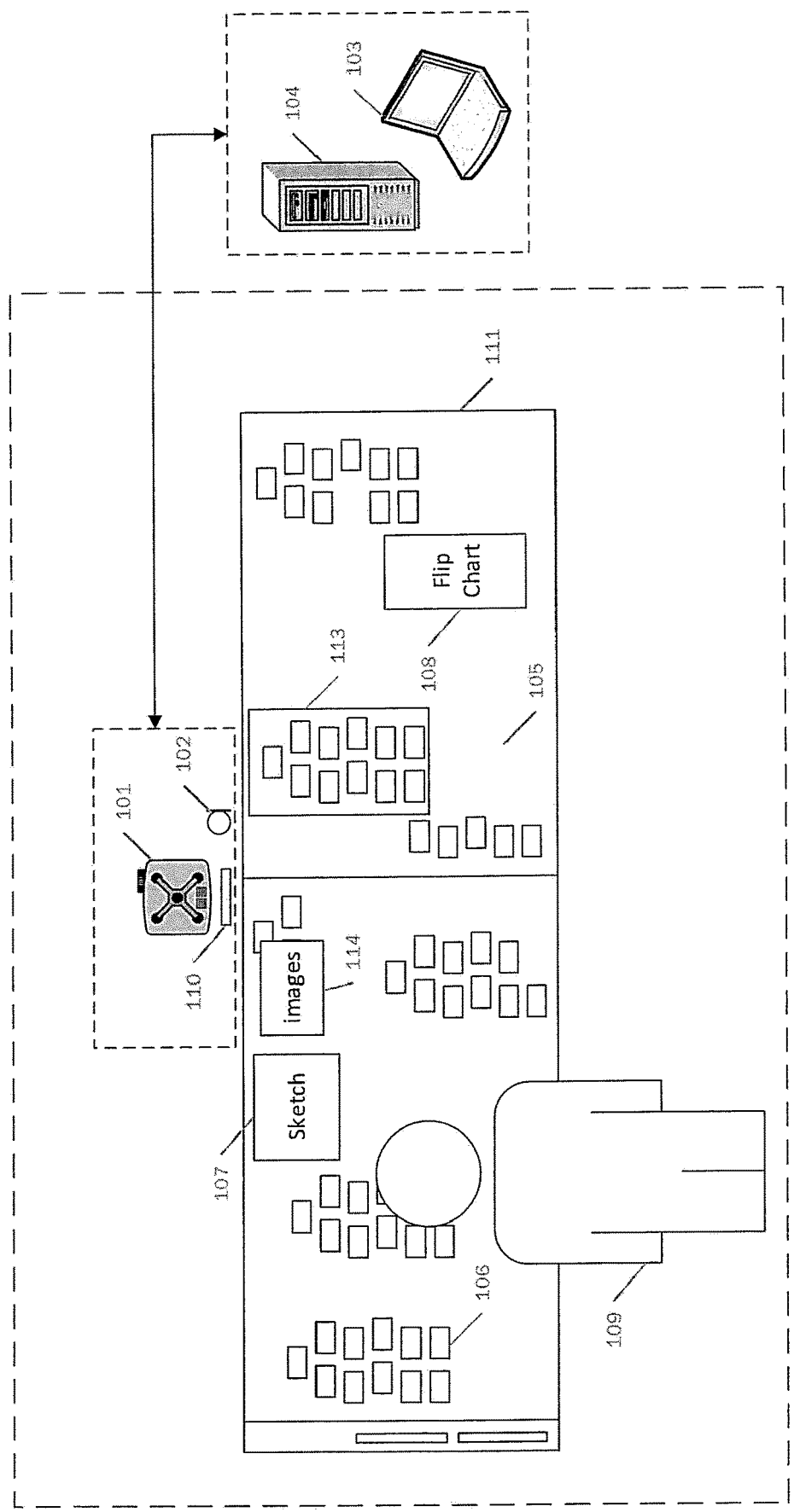
FIGS. 1a and 1b are illustrations depicting a presently preferred system configuration.
Figure 1B:
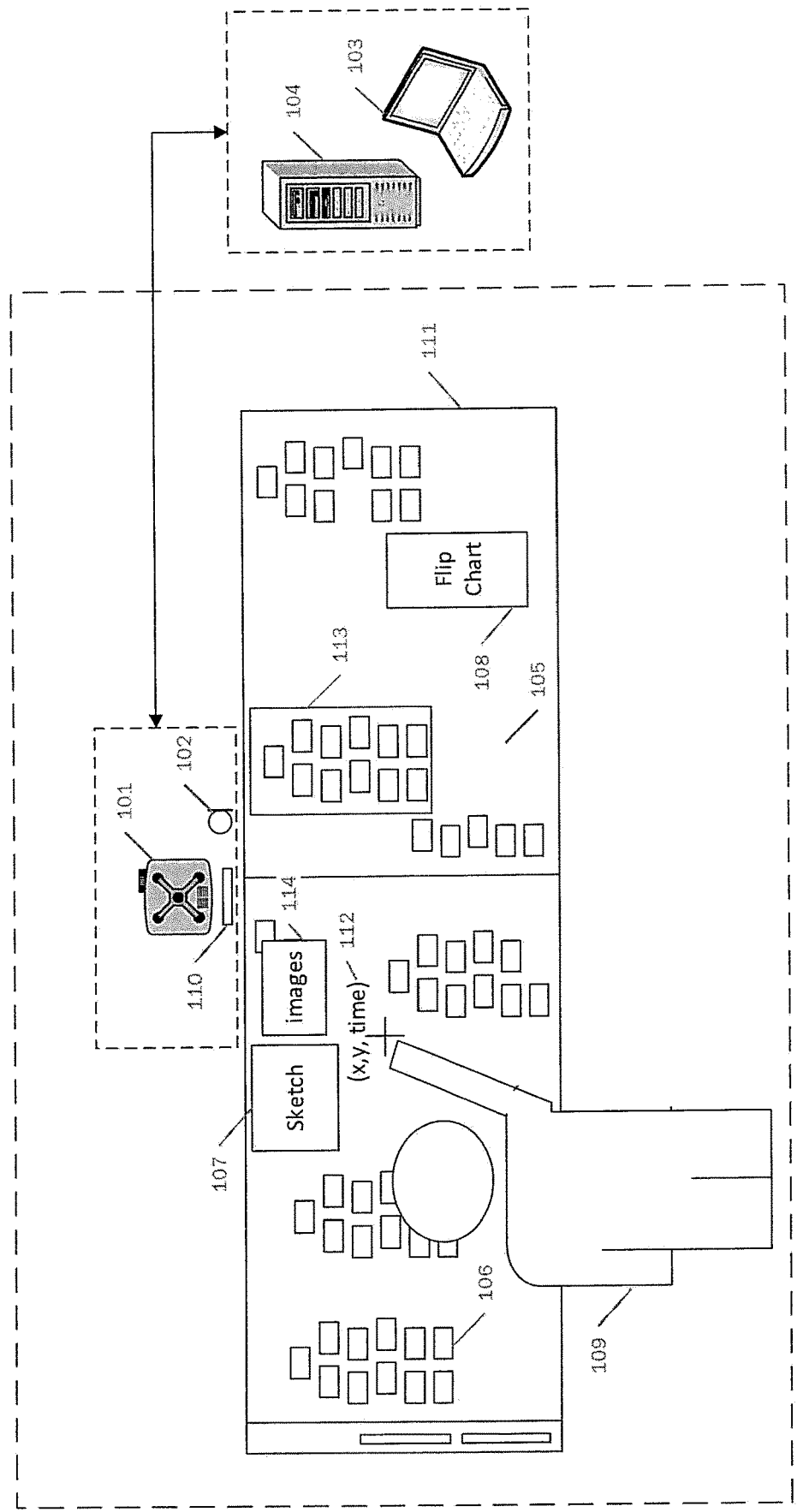

FIGS. 1a and 1b illustrate a system setup that a user might interact with according to an embodiment of the invention. The computational device, or computer, could be any standard PC either desktop 104 or laptop 103 or a smaller device that might have an integrated display and touch screen (Like a tablet). The computer may include one or more processors, a CPU, RAM, storage, video output, audio sound capability and the ability to connect with external peripherals, such as a display, touch system and microphone. Preferably, the computer processor(s) are configured to read program code from one or more computer readable media (such as memory ICs, CDs, DVDs, tape, etc.). The functions described herein may be embodied in software, hardware, firmware, or any combination thereof.

A "device" in this specification may include, but is not limited to, one or more of, or any combination of processing device(s) such as, a cell phone, a Personal Digital Assistant, a smart watch or other body-borne device (e.g., glasses, pendants, rings, etc.), a personal computer, a laptop, a pad, a cloud-access device, a white board, and/or any device capable of sending/receiving messages to/from a local area network or a wide area network (e.g., the Internet), such as devices embedded in cars, trucks, aircraft, household appliances (refrigerators, stoves, thermostats, lights, electrical control circuits, the Internet of Things, etc.).

An "engine" is preferably a program that performs a core function for other programs. An engine can be a central or focal program in an operating system, subsystem, or application program that coordinates the overall operation of other programs. It is also used to describe a special-purpose program containing an algorithm that can sometimes be changed. The best known usage is the term search engine which uses an algorithm to search an index of topics given a search argument. An engine is preferably designed so that its approach to searching an index, for example, can be changed to reflect new rules for finding and prioritizing matches in the index. In artificial intelligence, for another example, the program that uses rules of logic to derive output from a knowledge base is called an inference engine.

As used herein, a "server" may comprise one or more processors, one or more Random Access Memories (RAM), one or more Read Only Memories (ROM), one or more user interfaces, such as display(s), keyboard(s), mouse/mice, etc. A server is preferably apparatus that provides functionality for other computer programs or devices, called "clients." This architecture is called the client-server model, and a single overall computation is typically distributed across multiple processes or devices. Servers can provide various functionalities, often called "services", such as sharing data or resources among multiple clients, or performing computation for a client. A single server can serve multiple clients, and a single client can use multiple servers. A client process may run on the same device or may connect over a network to a server on a different device. Typical servers are database servers, file servers, mail servers, print servers, web servers, game servers, application servers, and chat servers. The servers discussed in this specification may include one or more of the above, sharing functionality as appropriate. Client-server systems are most frequently implemented by (and often identified with) the request-response model: a client sends a request to the server, which performs some action and sends a response back to the client, typically with a result or acknowledgement. Designating a computer as "server-class hardware" implies that it is specialized for running servers on it. This often implies that it is more powerful and reliable than standard personal computers, but alternatively, large computing clusters may be composed of many relatively simple, replaceable server components.

The servers and devices in this specification typically use the one or more processors to run one or more stored "computer programs" and/or non-transitory "computer-readable media" to cause the device and/or server(s) to perform the functions recited herein. The media may include Compact Discs, DVDs, ROM, RAM, solid-state memory, or any other storage device capable of storing the one or more computer programs.

The computer 103, 104 is shown connected to an interactive projector 101 and the associated touch detection system 110. The system would not be limited to projection systems and could be any interactive display. A "interactive display" in this specification may include, but is not limited to, one or more of, or any combination of interactive display devices(s) used to receive an interactive event on an interactive display such as, resistive, surface acoustic wave, capacitive, surface capacitance, projected capacitance, mutual capacitance, self-capacitance, use of styli on capacitive screens, infrared grid, optical imaging, dispersive signal technology, acoustic pulse recognition, gesture based controllers, depth aware cameras, wired gloves, stereo cameras, and/or any interactive display device capable of sending/receiving interactive events and messages to/from a local area network or a wide area network (e.g., the Internet), such as devices embedded in cars, trucks, aircraft, household appliances (refrigerators, stoves, thermostats, lights, electrical control circuits, the Internet of Things, etc.). A "touch" in this specification may include, but is not limited to, one or more of, or any combination of touch devices(s) used to create a touch event on an interactive display such as, stylus, human hand and all parts of the hand and fingers, laser pointers, infrared pointers, mice, gesture detection, motion detection, ultrasonic, capacitive, keyboard, Wi-Fi enabled, and/or any touch device capable of sending/receiving touch events and messages to/from a local area network or a wide area network (e.g., the Internet), such as devices embedded in cars, trucks, aircraft, household appliances (refrigerators, stoves, thermostats, lights, electrical control circuits, the Internet of Things, etc. The computer receives voice input from the user 109 via the connected microphone 102. The user 109 interacts with the graphical user interface 111 with objects—such as, but not limited to, notes 106, sketches 107, flipcharts 108, groups 113, images 114 and the background 105. Although those specific objects are shown, all standard operating system objects such as desktops, files, windows, icons, applications, programs, and equivalent objects are within the scope of this invention. The user is shown in FIG. 1b to be touching the interactive display 111 and generating a touch event, which may be any convenient touch attribute such as (x, y, time index) coordinates 112, in coordination with a speech event captured through the system microphone 102, which is continually capturing the speech events, processing them with ASR, and comparing potential commands with appropriate touch speech time windows, as shown in FIG. 10. This system is capable of providing user positional information and audio streams for plurality user source locations. For example, see the disclosures of U.S. Provisional Patent Application No. 62/346,263, filed Jun. 6, 2016, the entire contents of which are incorporated herein by reference.

FIG. 2a depicts a touch speech interface. The touch speech interface includes elements of a speech interface system with the addition of a touch listener 209, additional logic for the touch speech interface 204, registered information with the touch speech interface 210, and the fact that the ASR 203 is always on. Interface 210 is preferably registered with the touch-speech application by the application program 211. This registered information is preferably used by the logic element of the application 204 to make determinations for command words. There is also a tie in with the "Global Dictionary" as it is a compilation of all commands for registered objects. FIG. 6 depicts the use in operation. The wake word listener 202 is still possible to use, but it is now preferably a trigger or input for the logic of the touch speech interface 204 to start to parse the found words from the ASR 203.

FIG. 2b depicts the information that is registered 210 with the touch speech interface. Application programs 211, to preferably register one or more object types 212 that are to be associated with touch speech events. Each object type will preferably have a speech command list 213 comprising one or more commands, timespan information 214 for the object type which comprises time before a touch, a potential delay after touch, a time after a touch event, and other attributes 215 as desired. The touch speech interface preferably creates a global dictionary 314 from all the unique speech commands which will be used by the logic of the touch speech interface for potential touch speech matches. Alternatively, the application program 211 may create and register the global dictionary 314 instead of it being created by the touch speech interface.

FIG. 3 is a logic flow map depicting how the touch to speech interface preferably works with application programs, according to an embodiment of the subject invention. According to the present embodiment, the ASR 203 is preferably always running and determining if there are speech words that are a match to the words of a global dictionary 314. This global dictionary 314 preferably is a language agnostic list of all the potential words or phrases that the system might use, which preferably is an accumulation of all the individual object types associated commands (FIG. 4) that have been registered 210 with the touch speech interface. Each object type's commands could be thought of as a dictionary for the object type and the global dictionary is made up of all unique commands from all dictionaries. With the ASR 203 always running, there is no need to have a "Wake word" to invoke the ASR 203. The ASR 203 preferably has a constant input from the microphone/audio input 201. This permanent "on" state makes the system more efficient with speech commands as it is always capturing and processing speech and the user does not need to wait for it to initialize. The ASR 203 attempts to match speech input to the global dictionary 314 and creates a list of recognized words or phrases along with a timestamp 315 of when they were heard. This permanent "on" state affords the ability to match a touch event with a speech event that occurs before 1002, during or after the touch event 1003, 1004.

The logic of the speech interface receives an input from an application program 211 based on a touch event 301 that has a speech event associated with it 302. This event triggers the touch listener 304 to activate the logic for the touch speech interface 305. The touch speech logic takes the timestamp of the object type and ID touch event 303 and places the touch event in 306 waiting to be fulfilled. The touch speech logic then looks for a match with an associated command (FIG. 4) from the words that the ASR 203 found 315 and are in 307 waiting to be fulfilled, 316. If the timespan logic for the object matches a command that is within the correct timespan then it is a touch speech match 308, 309. When a match is found, the fulfillment component 206 then sends the ID (Of the object type and touch event) back to the application program 211 along with the associated command that was matched (FIG. 4). The associated command can be the command itself or an encoded representation. It is important to note that the timespan for an object can be from a defined time before the touch event 1002 to a defined time after the touch event 1003, 1004. As an example, the timespan could be 0.5 seconds before the touch event to 1 second after it or only time before 1002 or only time after or a delay 1003 after the touch event for a defined time 1004 or any combination of timespans. Preferably, the timespan will include pre-touch span, a delay, and a post-touch span. Preferably, the pre-touch span may range from 0.0 second 4.0 seconds before touch; more preferably from 0.0 second to 3.5 seconds before touch; even more preferably from 0.0 second to 3.0 seconds before touch; even more preferably from 0.0 second to 2.5 seconds before touch; even more preferably from 0.0 second to 2.0 seconds before touch; even more preferably from 0.0 second to 1.5 seconds before touch; even more preferably from 0.0 second to 1.0 seconds before touch; and most preferably 0.5 seconds before touch. Preferably, the delay time span may be from 0.0 seconds to 4.0 seconds; more preferably 0.5 to 3.5 seconds; even more preferably 1.0 to 3.0 seconds; even more preferably 1.5 to 2.5 seconds; even more preferably 2.0 seconds. Preferably, the post touch timespan ranges from 0.0 second to 5.0 seconds after touch; more preferably 0.5 second to 4.5 seconds; even more preferably 1.0 second to 4.0 seconds; even more preferably 1.5 second to 3.5 seconds; even more preferably 2.0 second to 3.0 seconds; even more preferably 2.5 seconds. Of course, any combination or these ranges is within the spirit and scope of the present invention.

The range of time before a touch event 1002 (FIG. 10) is set based on the amount of time that a user will reasonably take to select an object. A user might decide to change the color attribute of an object, issue the verbal command "Red", and then take time to determine which specific object to touch and then touch it. Some object types may require more thought than others before a selection is made. Simple commands are typically in the order of 1-1.5 seconds where some commands may need a window of up to 5 seconds. The appropriate window of time depends on the application and the complexity for the user. It is important to note that the speech command must be processed by the ASR 203 before it is sent to the touch speech logic and as such does not consume part of the time 1002.

The range of time after a touch event, both 1003 and 1004 combined, is set based on the amount of time it takes a user to decide what command to issue and the time it takes for the command to be spoken and processed by the ASR. If a user wants to change the color attribute of an object and they then touch the object, they then need to decide what color to change it to. The color command is determined by the user and is then spoken. In this case the user spoke "Marigold yellow." The speech is processed by the ASR and then provided to the touch speech logic. If the command is issued within the time span of 1003 and 1004 then it is a match. The delay after touch timespan 1003 can be altered by the logic of the touch speech interface to include an amount of time that encapsulates the most complex command for that object type to be processed by the ASR 203. This would allow more flexibility for the system to dynamically compensate the timespan based on spoken work complexity. Preferably, the delay timespan of 0-4 seconds plus the post touch time span of 0-5 seconds will yield 0-9 seconds.

The actual use of the timespan for 1002, 1003 and 1004 also includes an overlap based on how users interact with the system. An example would be a user speaking a command such as "Create new note" and then touches an object such as the background 105 before the speech has been processed by the ASR and sent to the touch speech logic. In this case the speech of the user is before the touch event, but for the touch speech logic the speech event would actually occur after the touch event. It would still be satisfied as a match as it falls within the timespan after the touch 1003, 1004.

If the touch speech interface receives an input 303 from an application program 211 and attempts to find a match within the timespan for the context of the object 309, but then receives a new input from the application program 303, before the timespan of the first input has elapsed 1003, 1004, the first input is discarded from 306 and the second input is used for a potential new match. Discarding the first event prevents accidental use if the user selects an object and then selects another object and then speaks a command, all within the timespan of the first object selected.

If the touch speech interface receives an input 315 from the ASR and places it into 307, waiting to be fulfilled, and a new input 315 is received before the timespan of the speech event has lapsed 1002 then the initial input is discarded and the new one is used to look for a touch speech match. It is important to note that the timespan for a command 1002 could differ from object type to object type and a command that is common for different object types that has different timespans 1002 then the longest timespan will be used to determine how long to keep the command. This allows a user to change the command before they select an object and have the second command be used instead of the first, "Red, no Blue". The logic 308 and 309 will still use the specific touch object context for the object type timespan when a potential match is found to determine if it should be validated.

When the touch speech interface logic 305 finds a match from the list of words that the ASR 203 has found, it removes the found words from the list 307, 311. This is to avoid a double use of the found words. If two input events are triggered close enough together such that the timespan after touch 1004 of the first event overlaps with the timespan before touch 1002 of the second input, it is possible that the second input could match the command that was intended for the first input. Removing the found command prevents this accidental usage.

The touch speech interface logic attempts to find a match of commands, for the defined timespan, of the object, from the list of commands that the automatic speech recognition has created 316 (306, 307, 308), 309, and immediately acts on a match even if the timespan for the match has not completely elapsed 309. This allows the system to react faster than waiting for the entire timespan to lapse for every touch object sent to the touch speech interface.

FIG. 4 is a table of presently preferred touch speech commands. It is a representative list and not limited to the interactions depicted. It is to illustrate the notion that there are different object types and associated with them are commands for speech.

FIG. 5 is a diagrammatic illustration of the architecture for a touch speech interface that supports audio position information and multiple audio streams. The modifications, compared to normal touch speech interface, include positional information from the audio source 201, additional logic for the touch speech interface 204 to utilize the positional information 910, additional logic for the fulfillment 206 to use the positional information 910, a calibration of the audio positioning with the touch system 501, and the ability to have multiple ASR 502, 503 running for multiple audio streams from the audio input 201.

FIG. 6 is a logic flow map depicting how the touch to speech interface works with application programs when positional information from the audio input system is present, as well as the ability to handle multiple audio streams (also with positional information) from the audio input device. When application programs 211 receive touch input 301, a determination is made if the touch is relevant for touch speech interaction 302. If it is relevant, the object type, ID, timestamp and X,Y touch location (112) 611 are sent to the touch listener 304, which identifies the object type and places the event in the touch portion 306 of the touch speech logic 601, 316 to then be processed. When speech has been picked up by the microphone system 201 along with X,Y or X,Y,Z positional information, the ASR 607 looks for a match against the global dictionary 314. If there is a match, then the found words or commands along with the positional information (X,Y or X,Y,Z) and time stamp 608 are sent to the speech event 307 portion of the touch speech logic 601, 316.

If there is data for both events in the same X,Y and/or X,Y,Z region 602, and there is a match for a touch event's associated commands for the object type that are within the touch speech time window for the touch event 309, then the fulfillment 206 is activated. The data for both events may be determined to be within the same region if they are within 150 centimeters of each other, more preferably within 100 centimeters of each other, even more preferably within 60, and even more preferably 30 centimeters of each other. Fulfillment 206 returns to the application program 211 the touch id, the matched command, and the inferred position information for events that require location context. The associated command can be the command itself or an encoded representation. Fulfillment 206 also removes the words from the ASR speech event list 307 and touch event list 306 that were used for the match 604 to prevent double usage. Of course, the same region may be determined by any convenient system, such as polar coordinates, etc.

The ASR 607 is preferably always running so that audio input is always processed. If the dispatcher portion of the ASR 607 determines that a new audio stream is coming from the microphone audio input system 605 and the location of the audio source is different than the latest audio source it is using, it will start a new instance of ASR to handle that new stream 609. The processing of the new ASR(s) follows normal logic and input into the text speech interface. Speech-only events preferably use a "Wake word" to trigger the wake word listener 202. This activates the touch speech interface logic to process speech commands 307 that do not have associated touch events. This lets the system operate as a traditional speech input interface 208 as well as a touch speech interface 211. With the positional information available 605, preferably only the processed commands that come from the same position as the initiating wake word are used. As the audio position in known, the fulfillment 206 also provides a location context for the command matched.

FIGS. 7a(i) and 7a(ii) are diagrams showing an example of ignoring speech events 702a outside a logical reach distance R 703. The system in this example is being used by two users 701 and 702, and is utilizing a system as configured in FIG. 6. User 701 (who is interacting with the interactive display) establishes an initial logical reach distance R 703. With the positional information for the audio present 605, only speech events that are within logical reach R 703 of the touch event 112 are used for touch speech commands. In this case, the person 702 not touching the interactive display 111 is not within the logical reach distance R 720 and as a result user 702 speech 702a is ignored in the context of the touch event 112 that initiated the touch speech interface logic (FIG. 6). This disambiguation prevents users not within the logical reach distance R 703 and the touch event 112 from activating speech commands related to that touch event 112. As the logical reach distance R 703 is extrapolated around the user 701 a logical reach region 720 is established. Preferably, the logical reach distance may be 0-60 feet, more preferably 0-50 feet, more preferably 0-40 feet, more preferably 0-30 feet, more preferably 0-20 feet, more preferably 0-10 feet, more preferably 0-5 feet, most preferably 0-3 feet. Of course, any desired distance may be used.

FIGS. 7b(i) and 7b(ii) depict a scenario utilizing touch speech logic with and without audio positioning information. The two users 704 and 705 are working at the interactive display 111, and are interacting with objects 106 and 107, respectively. In an example with no positional information, each touch event on the interactive display 111 that has a potential speech component, that the logic of the touch speech interface 305 receives, removes any previous events that were waiting for touch speech interaction commands. The same is true for matched speech commands from the global dictionary. If a new command is found, the old one is replaced by the new one. This creates a scenario where the two users will interfere with one another when attempting to use touch speech interactions as there is no disambiguation of user touches nor is there disambiguation of which user issued a command for which touch. With positional information available, as illustrated in the top view illustration, the touch speech logic 601 only discards previous touch events 106, 107 that are in the same logical reach R region 720 and only discards speech commands within the same boundary. In this case, both users are physically separated and can only issue commands to their respective touch regions 720a, 720b. Their speech to touch distance is represented by a logical reach distance 703a, 703b. The touch speech logic allows them to work simultaneously on the system and not interfere with each other's touch events and speech events. For systems with positional information but only one audio stream, the two users 704, 705 should take turns issuing commands so that the touch speech logic 204 can process each command separately. If the audio input system is capable of providing multiple audio streams 607 with X,Y and/or X,Y,Z information 605, then the two users 704, 705 can also issue commands simultaneously as the disambiguation of users allows the system to not replace an old command with a new one if it is from a different location.

FIGS. 7c(i) and 7c(ii) depict two users 701, 702 situated in front of an interactive display 111 and one of them (e.g., User 702) issues a speech-only command 709. With the positional information 605 of the audio known, it is possible to provide back to the application program 211 where to place the context of the command through the fulfillment engine 206. In this case, if the user 702 issued "System, create note," 709 then the application program 211 would be able to place the note 106 in front of the user 702.

FIGS. 7d(i), 7d(ii), and 7d(iii) depict three users 701, 710 and 711 situated in front of an interactive display 111 and user 710 issues a speech only command 712. In the case of user 710, if the audio system 102 is capable of providing the positional information 605 as well as the directionality for the audio, then a vector 713 of this direction can be used to determine where the intersection 715 would be for the touch system application program 211 on the interactive display 111. In the case of user 711, if the audio system is capable of providing the positional information 605 and the user 711 is walking towards the interactive display 111 as the user 711 issues a speech command 712, the audio system 102 can provide an intersection point 714 based on the vector of the moving positional audio information 717 with the touch interface 111.

Figure 8:
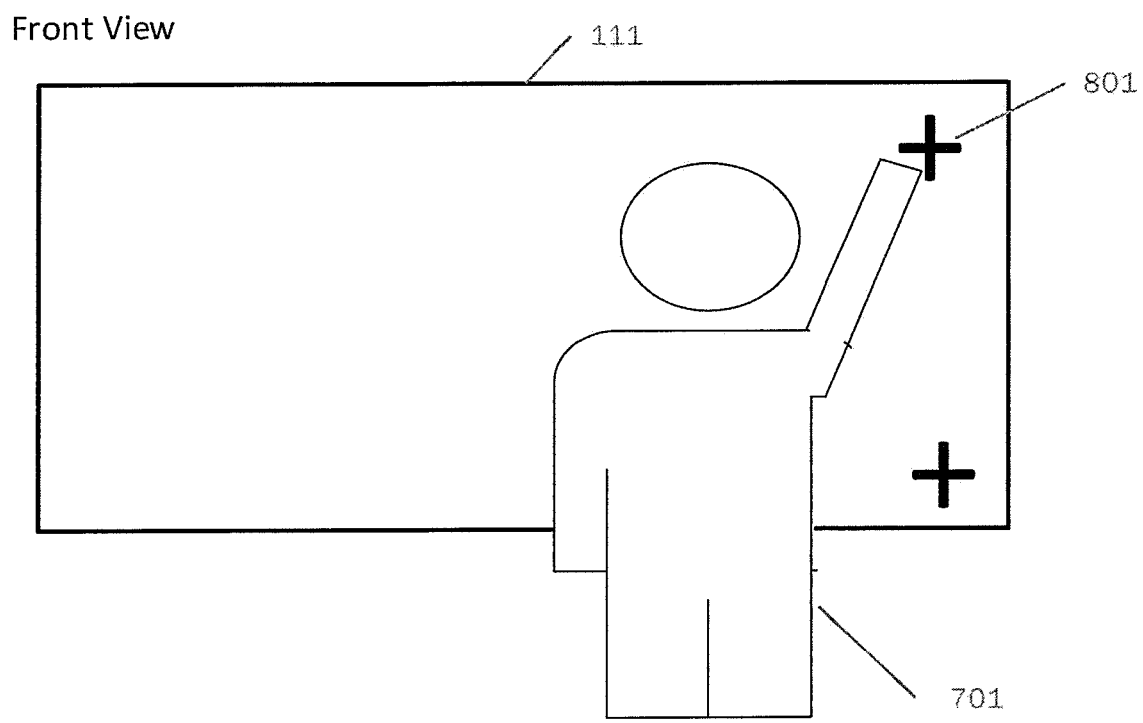
FIG. 8 is an illustration depicting a user calibrating the audio system with the interactive surface.

FIG. 8 depicts a user 701 calibrating the audio position 910 with a touch location 801 on the interactive display touch system 111. The user 701 taps on the target 801 that is displayed on the interactive display 111 so that a sound emits from this location. The audio system 102 can calculate the position of audio sources with respect to itself as the speed of sound and distance between microphones is known. The sound that is emitted from the touch location 801 could be from an object colliding with the touch surface or an object that purposefully emits a sound such as, but not limited to, an active stylus or a mobile device. The calibration of the audio system with respect to x, y, z 910 of the room and the calibration of the touch system with respect X,Y to the display pixels are preferably not part of the calibration of the audio system to the touch system, and may be performed independently (Audio calibration to room, and Touch calibration to display pixels). The Touch speech interface (FIG. 6) needs to understand where the touch system is located in the room in context of the audio input device 102, in order to provide meaningful location data back to application program 211, and as such, needs to be calibrated (FIG. 9). To calibrate the system, a touch point with a corresponding sound input is required, more preferably two to three touch points with matching sound input and even more preferably 4 or more touch points with corresponding sound inputs are required. The X,Y audio data from the sound input is then mapped to the corresponding X value from the touch system for the corresponding touch input. This limited set of information will allow location information back to the application program with an X display coordinate. If X, Y and Z are available from the audio source sound input 605, then location information provided back to the application program 211 can contain an X and Y display coordinate value.

Depending on the accuracy and use of the location information, a calibration can take any of the following:

No calibration—Assumption is made that the audio input device 102 is mounted above and centered with respect to the interactive display 111. This would function satisfactorily if the size of the interactive display 111 is known. The size of the interactive display 111 should be known for the scale. If the interactive display 111 contains this size information via its monitor's Extended Display Identification Data (EDID) information, then it may be used.

Calibration of one point—This would provide an approximation of the interactive display 111 location. If the interactive display 111 is relatively planar with the mounting of the audio input device 102 and it is centered then it would function with some accuracy. A calibration point at one end of the interactive display 111 could be used for the size, but this assumes that the interactive display touch sensor 110 and microphone system 102 are centered and on the same wall.

Calibration of two or three points—This would provide a useable calibration as the position of the interactive display 111 and the scale of the interactive display 111 would now be known in space. Projected display information could have a vertical or horizontal keystone error associated with it and this would not need be taken in to consideration with only two or three points.

Calibration of 4 or more points—This would provide a robust calibration, as the position of the interactive display 111, the scale of the display, and keystone error would be known.

An additional calibration can be performed when a user is selecting a calibration point 801 to provide the system with information relating to the logical reach 703 of the user 701. A user 701 can select the calibration point 801 and speak a word. The word will have an X,Y and (potentially) Z position information 910 from the audio system, and will provide the touch speech system (FIG. 6) a delta from the sound emitted from the touch location 910 selection from the user 701 speaking a word. The calibration of the logical reach 703 could happen after the calibration of the audio system to the touch system (FIG. 8) and selecting a touch location and speaking a word will provide the same delta even though the touch selection may or may not emit a sound. The user 701 can decide how much reach they wish the touch speech system (FIG. 6) to be tolerant to. They could stand very close to limit the logical reach 703 or they could maximize their reach to make it more accepting. The logical reach 703 may also be altered by a settings dialog or other user interface via an application interface 211.

Figure 9A:
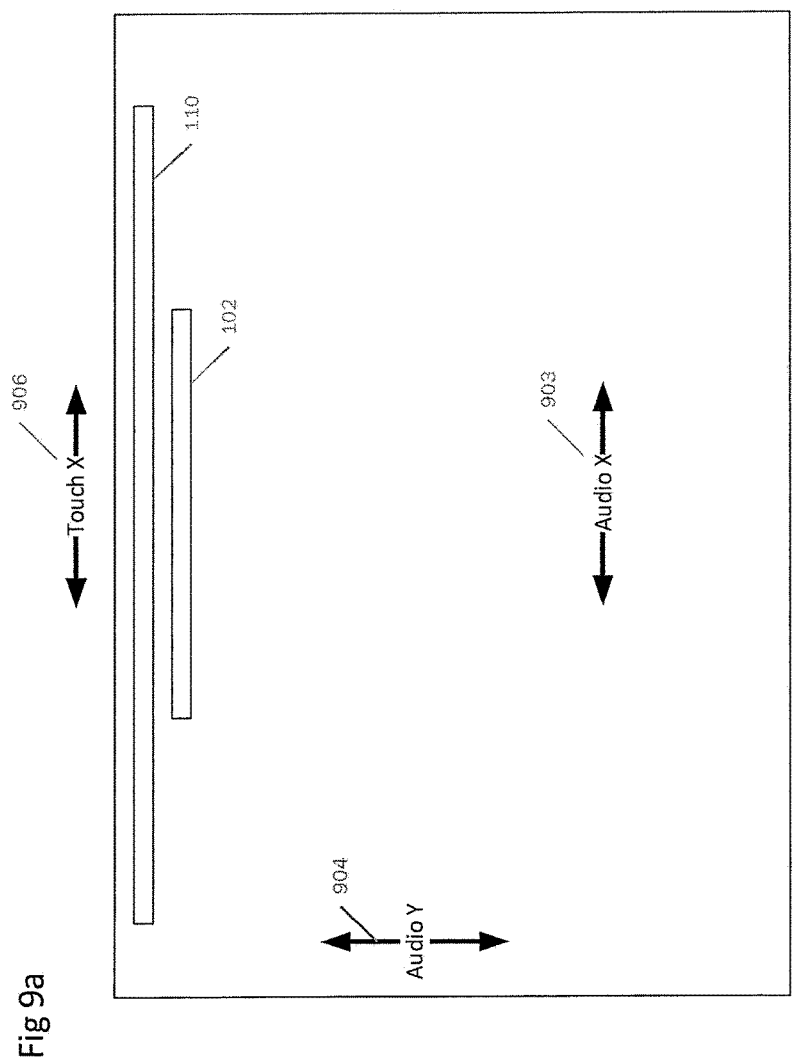
FIGS. 9a and 9b are illustrations of the audio and touch coordinate relationship.
Figure 9B:
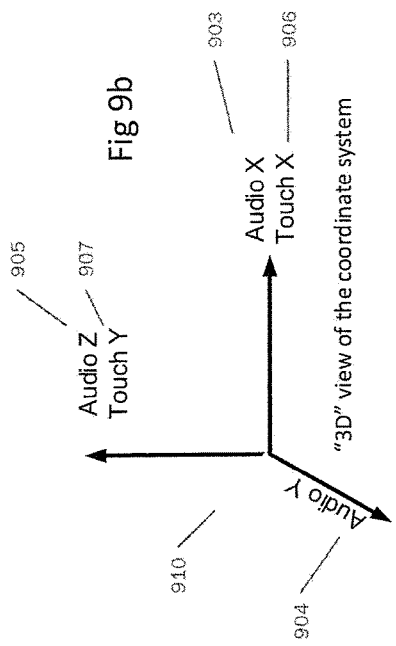

FIGS. 9a and 9b illustrate the relationship of (i) the touch system's 110 coordinate system and (ii) the audio input device's 102 coordinate system, to each other 910. The relationship depicted in FIGS. 9a and 9b has the audio input device mounted essentially on the same surface as the touch input system where (i) the audio input device provides positional information such that an X component 903 is oriented horizontally, a Y component 904 is oriented perpendicular to said mounting surface and a Z component 905 is oriented vertically and (ii) the touch input system provides touch information such that a Y component 907 is oriented vertically and an X component 906 is oriented horizontally. In the configuration shown, the audio X 903 has essentially the same axis as the touch X 906. If the audio system is capable of providing a Z positional component 905 then, in the configuration shown, it is essentially the in same axis as the touch system's Y coordinates 907. The relationship of the touch system's coordinate system and the audio input device's coordinate system will vary based on the mounting position of one device with respect to one another. If the systems are not mounted on essentially the same surface then translations of the coordinate systems will need to be applied as part of the calibration process.

FIG. 10 depicts the elements of the timespan that is part of the context for a touch event 1001, also referred to as the touch speech time window, on an object that would be sent to the touch speech interface 1002. The timespan is made up of three elements, the amount of time before a touch event 1002, a potential delay after the touch event 1003, and the time after the touch event 1004. This overall time span is used by the logic of the touch speech interface 1002, which then attempts to match words that the ASR 203 has found from the incoming audio input 201 to a list of associated commands. The timespan itself could be registered as a global timespan for the application, or it could be one or more unique timespans registered for individual object types, or it could be additional timespan logic for individual touch context events that are send to the touch speech interface.

The individual components shown in outline or designated by blocks in the attached Drawings are all well-known in the electronic processing arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A speech capturing and processing system comprising:
a microphone system that receives audio inputs that includes speech input; and
at least one processor configured to execute a plurality of applications, including:
an automatic speech recognition (ASR) application that captures and processes audio input received by the microphone system to determine if the audio input includes speech input, wherein the audio input is from one or more sound sources in a shared physical space; and
an application that determines positional information of the one or more sound sources in the shared physical space, wherein the sound source positional information includes at least one of (i) X, Y and (ii) X,Y, and Z sound source positional information.

2. The speech capturing and processing system of claim 1 wherein the at least one processor is located separately from the microphone system.

3. The speech capturing and processing system of claim 1 further comprising a wake word listener.

4. The speech capturing and processing system of claim 3 wherein the wake word listener listens for a wake word to trigger ASR logic to process speech commands.

5. The speech capturing and processing system of claim 4 wherein the application that determines positional information determines the positional information of the wake word sound source.

6. The speech capturing and processing system of claim 5 wherein the ASR only processes speech commands that come from the same position as the wake word source.

7. The speech capturing and processing system of claim 1 wherein the ASR is always running so that audio input is always processed.

8. The speech capturing and processing system of claim 1 wherein the application that determines positional information determines that the audio input is coming from a second position different than a first sound source position.

9. The speech capturing and processing system of claim 8 wherein the processor starts a new instance of an ASR to handle the audio input from the different second position.

10. Program code embodied in a non-transitory computer readable medium for speech input, said program code comprising instructions causing at least one processor to:
receive audio inputs that includes speech input;
perform automatic speech recognition (ASR) to captures and processes audio input, from one or more sound sources in a shared physical space, to determine if the audio input includes speech input; and
determine positional information of the one or more sound sources in the shared physical space, wherein the sound source positional information includes at least one of (i) X, Y and (ii) X,Y, and Z sound source positional information.

11. The program code according to claim 10 wherein the instructions cause the at least one processor to listens for a wake word to trigger ASR logic to process speech commands.

12. The program code according to claim 11 wherein the instructions cause the at least one processor to determine the positional information of the wake word sound source.

13. The program code according to claim 12 wherein the instructions cause the at least one processor to only processes speech commands that come from the same position as the wake word source.

14. The program code according to claim 13 wherein the instructions cause the at least one processor to determine that audio input is coming from a second position different than the sound source position.

* * * * *